US012158251B2

(12) United States Patent
Zhou

(10) Patent No.: US 12,158,251 B2
(45) Date of Patent: Dec. 3, 2024

(54) FLAME SIMULATION PROJECTION DEVICE

(71) Applicant: NINGBO RICHEN ELECTRICAL APPLIANCE CO., LTD, Beilun (CN)

(72) Inventor: Wei Zhou, Beilun (CN)

(73) Assignee: NINGBO RICHEN ELECTRICAL APPLIANCE CO., LTD, Ningbo Province (CN)

(*) Notice: Subject to any disclaimer, the term of this patent is extended or adjusted under 35 U.S.C. 154(b) by 20 days.

(21) Appl. No.: 17/931,625

(22) Filed: Sep. 13, 2022

(65) Prior Publication Data

US 2024/0027042 A1 Jan. 25, 2024

(30) Foreign Application Priority Data

Jul. 25, 2022 (CN) ......................... 202221922692.1

(51) Int. Cl.
*F21S 10/04* (2006.01)

(52) U.S. Cl.
CPC ............. *F21S 10/046* (2013.01); *F21S 10/04* (2013.01)

(58) Field of Classification Search
CPC ......... F21S 10/04; F21S 10/043; F21S 10/046
See application file for complete search history.

(56) References Cited

U.S. PATENT DOCUMENTS 3,603,013 A * 9/1971 Reed ....................... F21S 10/04 40/428
6,050,011 A * 4/2000 Hess ....................... F24C 7/004 40/427
6,393,207 B1 * 5/2002 Martin .................... F24C 7/004 40/431
6,615,519 B2 * 9/2003 Hess ....................... G09F 19/12 40/428
2002/0095832 A1 * 7/2002 Hess ....................... F24C 7/004 472/65
2003/0049024 A1 * 3/2003 Chen ....................... F24C 7/004 362/35

(Continued)

FOREIGN PATENT DOCUMENTS

CN 211372249 U * 8/2020 ............. F21S 10/04

OTHER PUBLICATIONS

Zhou, Simulation flame simulation device, 2020, CN211372249U (Year: 2020).*

*Primary Examiner* — Peggy A Neils
*Assistant Examiner* — James M Endo
(74) *Attorney, Agent, or Firm* — McDonnell Boehnen Hulbert & Berghoff, LLP

(57) ABSTRACT

A flame simulation projection device including a first light source, a light reflection mechanism, a second light source and a housing, wherein the first light source, the light reflection mechanism and the second light source are separately matched and connected to the housing; the first light source is disposed facing the light reflection mechanism; the housing forms an inner cavity; and the second light source is disposed facing the outside of the inner cavity. Since the first light source, the light reflection mechanism, the second light source and the housing form a standardized, serialized and integrated module, it can not only speed up the progress of production, assembly and maintenance of products, but also be designed by DIY. Users can freely arrange flame imaging screens and/or simulated fuel beds.

10 Claims, 4 Drawing Sheets

(56) References Cited

U.S. PATENT DOCUMENTS

| | | | | |
|---|---|---|---|---|
| 2003/0156828 | A1* | 8/2003 | Jamieson | F24C 7/004 40/427 |
| 2005/0063685 | A1* | 3/2005 | Bristow | F24C 7/004 392/348 |
| 2005/0252051 | A1* | 11/2005 | Chen | F24C 7/004 40/428 |
| 2006/0098428 | A1* | 5/2006 | Rosserot | F24C 7/004 362/227 |
| 2007/0107279 | A1* | 5/2007 | Wei | G09F 13/30 40/428 |
| 2009/0126241 | A1* | 5/2009 | Asofsky | F24C 7/004 348/744 |
| 2009/0220221 | A1* | 9/2009 | Zhou | F24C 7/004 40/428 |
| 2009/0310340 | A1* | 12/2009 | Betz | F24C 7/105 362/183 |
| 2011/0299283 | A1* | 12/2011 | Gallo | F21S 10/04 362/282 |
| 2012/0155075 | A1* | 6/2012 | Asofsky | F24C 7/004 362/231 |
| 2013/0139422 | A1* | 6/2013 | Lu | F24C 7/004 40/428 |
| 2015/0052791 | A1* | 2/2015 | Lu | F21S 10/046 40/428 |
| 2015/0338105 | A1* | 11/2015 | Lu | F21S 10/046 40/428 |
| 2016/0169528 | A1* | 6/2016 | Lu | F24D 13/00 219/220 |
| 2017/0167678 | A1* | 6/2017 | Gallo | F24C 7/004 |
| 2017/0328575 | A1* | 11/2017 | Crowe | F24C 7/004 |
| 2018/0299086 | A1* | 10/2018 | Gallo | F21S 10/046 |
| 2018/0363870 | A1* | 12/2018 | Jones | F24C 7/004 |
| 2019/0137059 | A1* | 5/2019 | Zhou | F24B 1/1808 |
| 2020/0224842 | A1* | 7/2020 | Yao | F21S 10/046 |

* cited by examiner

FLAME SIMULATION PROJECTION DEVICE

CROSS-REFERENCE TO RELATED APPLICATIONS

This application claims priority to Chinese Patent Application No. 202221922692.1, filed on Jul. 25, 2022, which is incorporated by reference herein in its entirety.

TECHNICAL FIELD

The present invention relates to the technical field of electric fireplaces, and in particular to a flame simulation projection device, which is used for simulating projection imaging of solid fuel combustion on an electric fireplace.

BACKGROUND ART

Electric fireplaces not only have heating functions, decoration and beautification functions, but also become more and more popular among consumers due to their use of electric heating, and their clean and hygienic use.

At present, there are many types of projection devices used for flame simulation on electric fireplaces. A projection device used by them is composed of a first light source for simulating projection imaging of flames, a light reflection mechanism, an imaging screen, a second light source for simulating fuel bed projection imaging, and a simulated fuel bed, which are separately disposed inside the product, are not associated with each other and are installed inside the product independently. The first light source and the second light source separately directly perform projection imaging to simulate the effect of flame burning.

Since there is no connection between various components that act as a projection device and generate projected light, and they are installed independently inside the product, a wide variety of components will inevitably lead to cumbersome installation, which is not conducive to the industrialized mass production of flame simulation projection devices and the maintenance of subsequent products.

In addition, in current electric fireplaces, the components that act as the projection device and generate the projected light, and the flame imaging screen and/or the simulated fuel bed are all directly mounted on the electric fireplace, and they are indispensable. However, users sometimes design different shapes of flame imaging screens and/or simulated fuel beds by DIY, and at this time, the flame imaging screens and simulated fuel beds are limited by the lack of a separate integral projection module.

SUMMARY OF THE INVENTION

The technical problem to be solved by the present invention is to overcome the technical defects of the background art and provide a flame simulation projection device. After the structure of the present invention is used for the flame simulation of the electric fireplace, a first light source, a light reflection mechanism and a second light source are combined and disposed into an integral flame simulation projection device by means of a housing to form a modularized multi-light source integrated projection device. At the same time, a control unit, a power supply interface, and a peripheral drive interface may be disposed inside this device. At this time, as long as a flame imaging screen and/or a simulated fuel bed are/is combined, the effect of DIY flame simulation can be realized, and even ambient lights and other components may be added in the periphery. The structure is simple, and the operation is convenient. In addition, this device may also be provided with an installation bracket and a built-in drive interface, which is convenient for installing this device on an electric fireplace to carry out flame simulation. If it needs to be replaced later, this device can be removed and replaced as a whole, which is convenient and quick. Furthermore, since the first light source, the light reflection mechanism and the second light source form an integral flame simulation projection device, forming a module is convenient for industrialized mass pre-production, thereby speeding up the progress of product production and assembly.

The technical solution adopted by the present invention to solve the above technical problem is as follows:

A flame simulation projection device comprises a first light source, a light reflection mechanism, a second light source and a housing; the first light source, the light reflection mechanism, and the second light source form a whole by means of certain separate connections between them and the housing, and light emitted by the first light source is exactly irradiated only onto the light reflection mechanism.

Further, the housing forms a closed or semi-closed inner space or inner cavity, and the first light source and the light reflection mechanism are disposed in the inner space or inner cavity of the housing; and the inner space or the inner cavity is defined and formed by an outer shell of the housing, for example, by a left wall, a right wall and a bottom wall in the outer shell, or by a left wall, a right wall, a top wall, a bottom wall, a front wall and a rear wall in the outer shell.

Further, the housing is provided with a first flame imaging hole, wherein the light reflected by the light reflection mechanism from the first light source can be emitted outward from the first flame imaging hole.

Further, the shape of the first flame imaging hole is set to a flame shape.

Further, the first flame imaging hole may be an empty hole, or may be made of a transparent material, wherein a flame shape is formed by printing or spraying paint on some positions of the transparent material, thereby forming a transparent hole.

Further, a light blocking plate is further provided above the side of the first light source, and the light blocking plate is disposed between the first light source and the first flame imaging hole, which can prevent the light emitted from the first light source from directly passing through the first flame imaging hole to be emitted to the outside.

Further, the second light source may be disposed in the inner space or inner cavity of the housing, or may be disposed outside the outer space or inner cavity of the housing.

Further, when the second light source is disposed in the inner space of the housing, a second flame imaging hole is further provided at a corresponding position of the housing, and the light emitted by the second light source can be emitted from the second flame imaging hole.

The housing is disposed to form a closed or semi-closed interior space. The first light source, the light reflection mechanism, and the second light source are all disposed inside the housing. The housing can provide better protection for the first light source, the light reflection mechanism and the second light source, and it is not easy to damage the first light source, the light reflection mechanism and the second light source during turnover transportation. Moreover, when the housing forms a closed housing, a user cannot touch moving parts, so it is safer to use.

Further, the first light source is disposed below the light reflection mechanism, including below the front part, just below and below the rear part.

Further, the light reflection mechanism comprises a driving mechanism and a reflecting mechanism; and the driving mechanism drives the reflecting mechanism to rotate about an axis.

Further, the second light source is disposed below a front part of the housing, and the light emitted by the second light source faces obliquely upward; and the front part refers to a direction facing the flame imaging screen of the present invention.

Further, the flame simulation projection device is further provided with a control unit and a power supply interface, the power supply interface is used to supply power to the flame simulation projection device, and the control unit is used to control the first light source, the second light source, and the driving mechanism to work. Since the flame simulation projection device has its own control unit and power supply interface, and the flame simulation projection device is an integral module, it can be sold as an independent product, and the user can freely match various flame imaging screens and/or simulated fuel beds on the basis of this device to carry out various DIY designs and secondary development.

Further, the housing is provided with a peripheral drive interface; and the peripheral drive interface means that the control unit on the flame simulation projection device can output signals to control other external elements, such as atmosphere lights, auxiliary heating elements, etc., added in the DIY designs.

Further, the housing is provided with a built-in drive interface; and the built-in drive interface means that the flame simulation projection device can receive control signals from the outside through this built-in drive interface, and use the signals to control the first light source, the second light source and the driving mechanism in the device. At this time, this device can be installed on an electric fireplace as a whole, and after connecting the built-in drive interface to the control unit on the electric fireplace, the working of the first light source, the second light source and the driving mechanism can be controlled.

Further, the housing is provided with an installation bracket; and the installation bracket and the housing may be a whole, or may be two independent components that are combined together in a certain way. By means of the installation bracket, the whole device can be conveniently installed on an electric fireplace.

The basic principle of the present invention is as follows:

In the present invention, the first light source, the light reflection mechanism, the second light source and the housing are formed into an integral module, thereby forming an integral flame simulation projection device module. Since the flame simulation projection device of the present invention is a whole, it can be mass-produced in advance, and then directly provided to users for DIY design and secondary development.

The electric fireplace of the present invention may further include a simulated fuel bed. The simulated fuel bed is made of a transparent or translucent material, and is a structure for simulating the ash, residual material and residual fire produced by the combustion of real solid fuel. The light emitted by the second light source is irradiated on the bottom of the simulated fuel bed, thereby forming a bright and dark effect of simulating the combustion of real solid fuel, and it complements the flame projected and imaged on the flame imaging screen to form an interesting picture of a real solid fuel burning slowly.

The present invention is integrally installed on an electric fireplace in a certain installation manner, and can work in two ways to simulate flame projection imaging, thereby forming a vivid dynamic flame effect:

(1) When this device is provided with a control unit, a power supply interface, and/or a peripheral drive interface, it is in an active working mode, wherein the power supply interface is used to supply power to the control unit, thereby controlling the first light source, the second light source, the driving mechanism, and/or the peripheral drive interface of this device to work.

(2) When this device is provided with a built-in drive interface, it is in a passive working mode, wherein this device is installed on an electric fireplace as a whole, and the built-in drive interface is connected to the control unit on the electric fireplace, thereby controlling the first light source, the second light source and the driving mechanism of this device to work.

Compared with the prior art, the present invention has the following beneficial effects:

The present invention provides a flame simulation projection device. Since the first light source, the light reflection mechanism, the second light source and the housing form a standardized, serialized and integrated module, after this device is used on an electric fireplace, it can be quickly disassembled and replaced during subsequent maintenance. The structure is simple, convenient and quick, and manpower and material resources are saved. In addition, this device can be industrially produced in batches, and can be sold separately. Furthermore, this device can also be designed by DIY. Users can freely arrange the flame imaging screen and/or the simulated fuel bed according to this device to simulate the effect of flame combustion. The structure is simple, convenient and quick.

The names of components corresponding to reference numbers in the figures are as follows:

1—first light source; 2—light reflection mechanism; 21—driving mechanism; 22—reflecting mechanism; 3—housing; 31—first flame imaging hole; 32—second flame imaging hole; 33—installation bracket; 331—installation hole; 34—built-in drive interface; supply interface; 36—peripheral drive interface; 4—light blocking plate; 5—second light source; 6—control unit; 7—flame imaging screen; and 8—simulated fuel bed.

DETAILED DESCRIPTION OF PREFERRED EMBODIMENTS

In order to better understand the content of the present invention, it will be further explained below with reference to specific embodiments and accompanying drawings. It should be understood that these embodiments are only used to further explain the present invention, but are not used to limit the scope of the present invention. In addition, it should be understood that after reading the contents of the present invention, a person skilled in the art can make some non-essential changes or adjustments to the present invention, which still belong to the scope of protection of the present invention.

Embodiment 1

Figure 1:
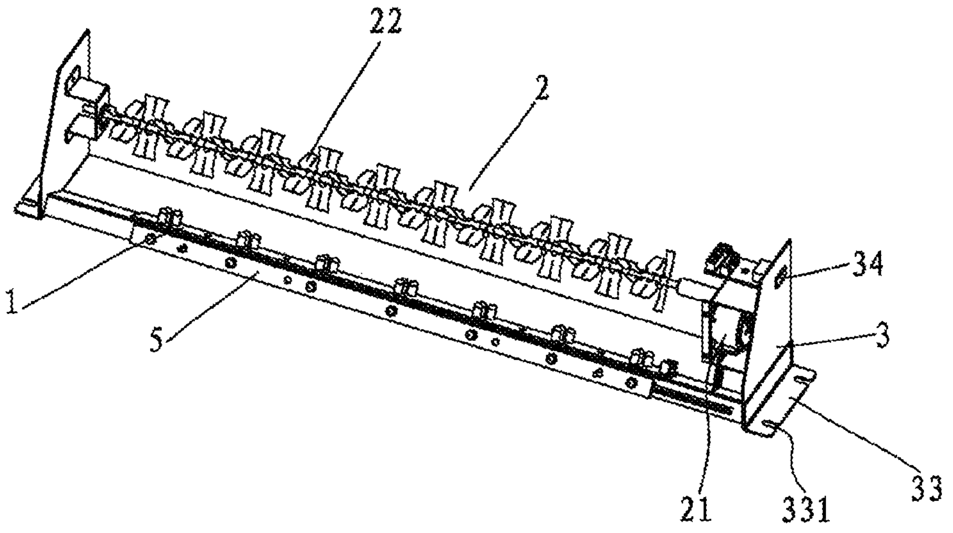
FIG. 1 is a schematic diagram of a three-dimensional structure of a flame simulation projection device according to Embodiment 1 of the present invention.
Figure 2:
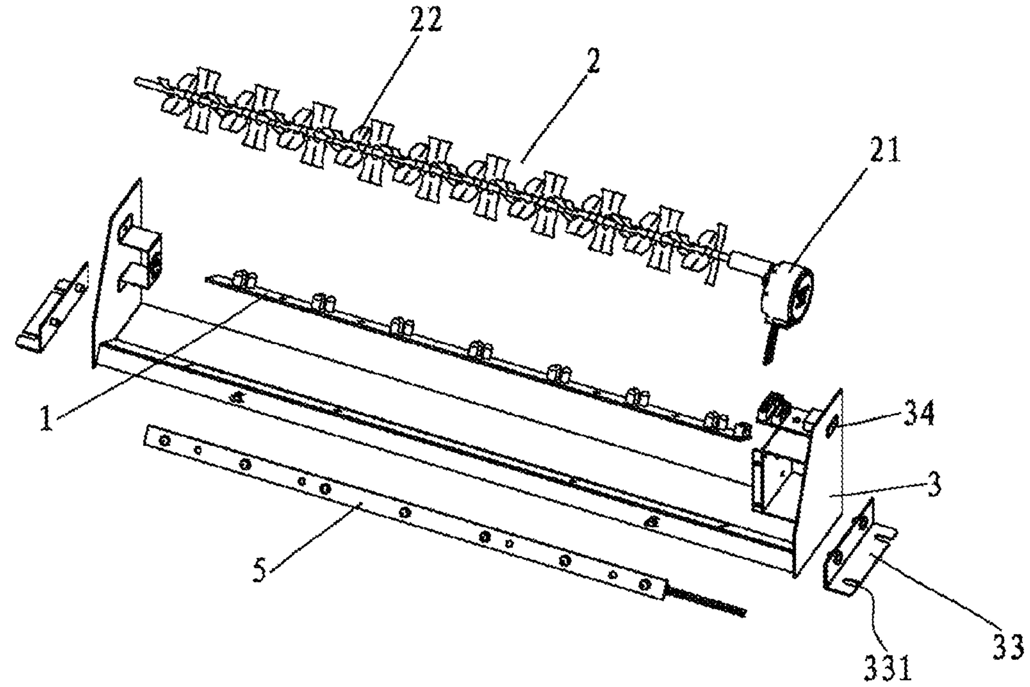
FIG. 2 is a schematic diagram of an exploded structure of the flame simulation projection device according to Embodiment 1 of the present invention.
Figure 3:
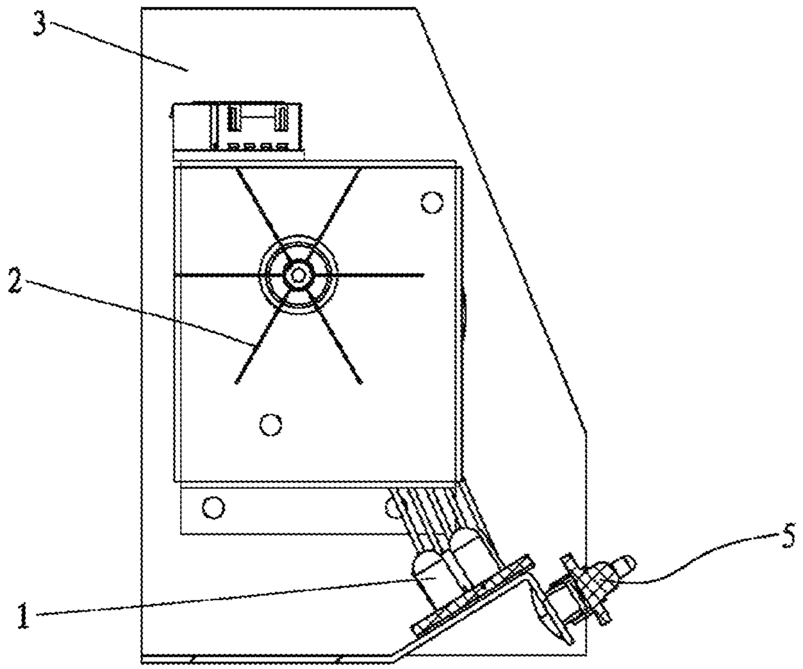
FIG. 3 is a schematic diagram of a half-section structure of the flame simulation projection device according to Embodiment 1 of the present invention.
Figure 4:
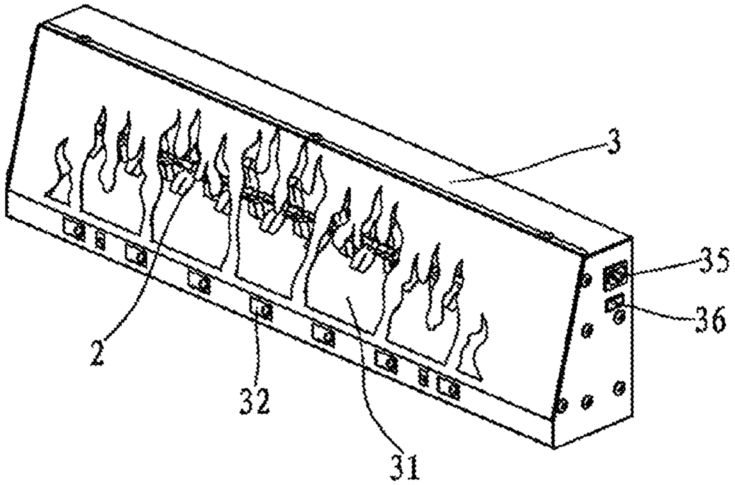
FIG. 4 is a schematic diagram of a three-dimensional structure of a flame simulation projection device according to Embodiment 2 of the present invention.
Figure 5:
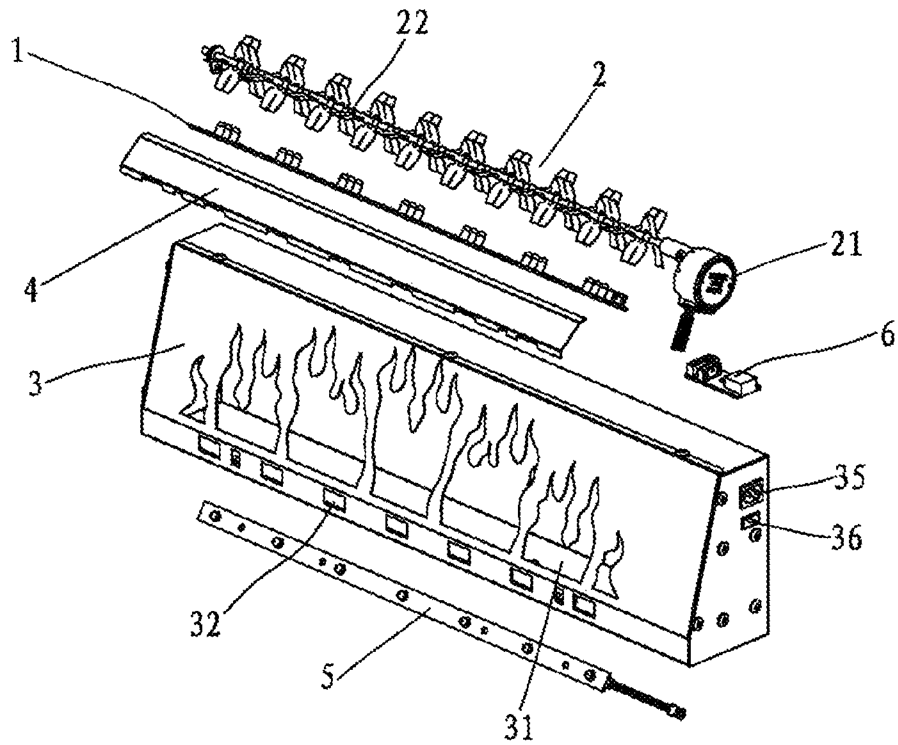
FIG. 5 is a schematic diagram of an exploded structure of the flame simulation projection device according to Embodiment 2 of the present invention.
Figure 6:
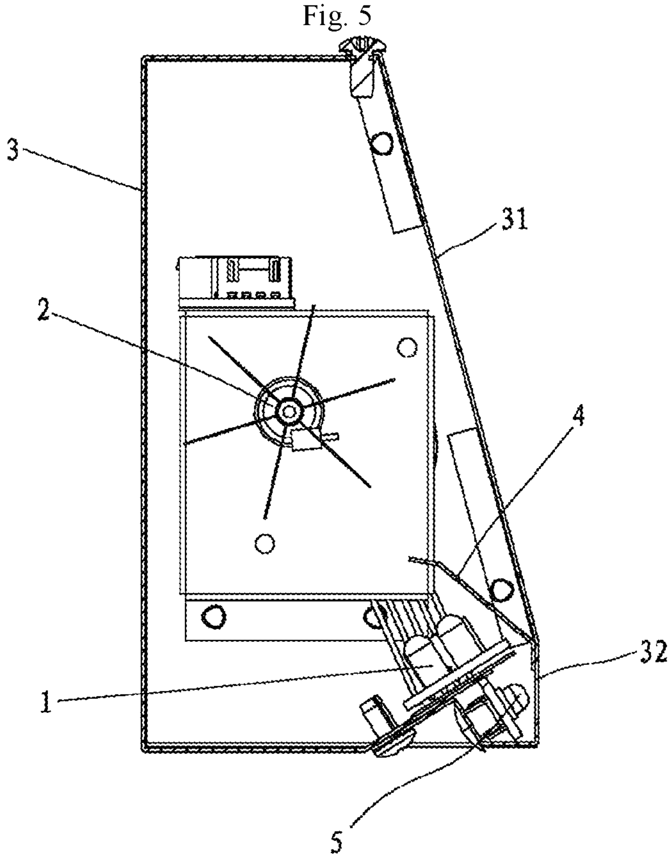
FIG. 6 is a schematic diagram of a half-section structure of the flame simulation projection device according to Embodiment 2 of the present invention.
Figure 7:
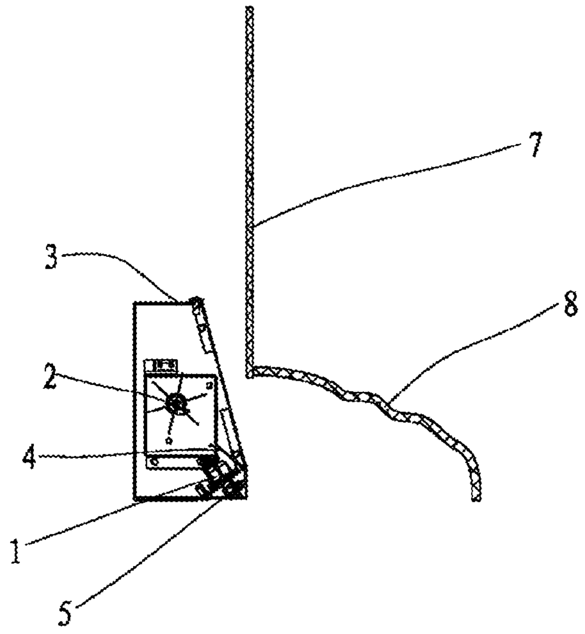
FIG. 7 is a schematic diagram of a half-section structure of the flame simulation projection device according to Embodiment 2 of the present invention when it is assembled with a flame imaging screen and a simulated fuel bed by DIY.
Figure 8:
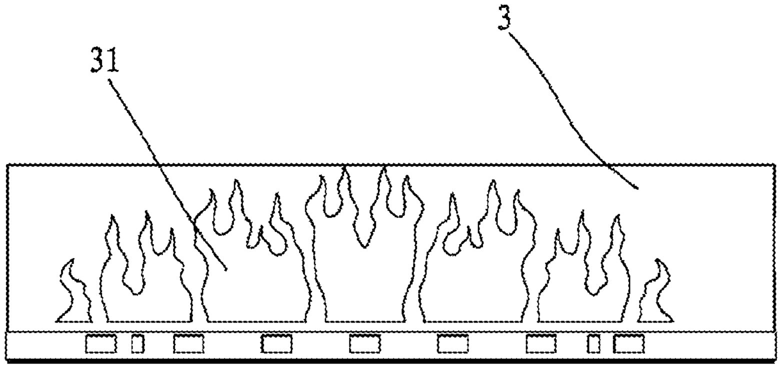
FIG. 8 is a schematic diagram of a front shape of a first flame imaging hole in the flame simulation projection device according to Embodiment 2 of the present invention.

As shown in FIGS. 1 to 3, a flame simulation projection device comprises a first light source 1, a light reflection mechanism 2, a second light source 5 and a housing 3, wherein the first light source 1, the light reflection mechanism 2, and the second light source 5 form a whole with the housing 3. In this embodiment, the housing 3 is an open housing, and an inner cavity defined by a left wall, a right wall and a bottom wall is formed inside. The light reflection mechanism 2 is disposed in a middle region of the inner cavity. The light reflection mechanism 2 comprises a driving mechanism 21 and a reflecting mechanism 22, and the driving mechanism 21 drives the reflecting mechanism 22 to rotate about an axis. The first light source 1 is disposed below the front of the light reflection mechanism 2. The light emitted by the first light source 1 is exactly irradiated only on the light reflection mechanism 2. The second light source 5 is disposed facing the outside of the inner cavity, and the light emitted by the second light source 5 is directed obliquely upward.

The housing 3 is further provided with an installation bracket 33. In this embodiment, the installation bracket 33 is provided with an installation hole 331. The installation bracket 33 and the housing 3 are two components that are assembled into one body by means of screws. A built-in drive interface 34 is provided on a side surface of the housing 3. After connecting the built-in drive interface 34 and a control unit on an electric fireplace, the working of the first light source 1, the second light source 5 and the driving mechanism 21 can be controlled.

The working process of this embodiment is as follows:

When working, the reflecting mechanism 22 rotates according to a certain rule under the driving of the driving mechanism 21, the light emitted by the first light source 1 is irradiated on the reflecting mechanism 22, and the reflecting mechanism 22 emits the light outward. Since the reflecting mechanism 22 is rotating, the light reflected by the reflecting mechanism 22 is dynamic. At the same time, the second light source 5 is also emitting light. Therefore, when the flame simulation projection device of this embodiment is installed on an electric fireplace, the first light source 1 and the second light source 5 can perform imaging at the same time.

In this embodiment, the first light source 1, the light reflection mechanism 2, and the second light source 5 are assembled into a whole by means of the housing 3 to form an integrated projection device with multiple light sources, which is convenient for installation when used for flame simulation on an electric fireplace. The structure is simple, quick and convenient, saving manpower and material resources. In addition, the flame simulation projection device in this embodiment is a whole, which can be standardized and designed to form a serialized and modular component. It can be manufactured before the electric fireplace. Then, it can be easily installed on the electric fireplace by means of the installation hole 331 on the installation bracket 33. At the same time, the built-in drive interface 34 is connected to the control unit on the electric fireplace, and the working states of the first light source 1, the second light source 5 and the driving mechanism 21 are controlled by means of the built-in drive interface 34. The flame simulation projection device can also be quickly removed and replaced during the later maintenance and repair thereof.

Embodiment 2

As shown in FIGS. 4 to 8, a flame simulation projection device comprises a first light source 1, a light reflection mechanism 2, a second light source 5 and a housing 3, wherein the first light source 1, the light reflection mechanism 2, and the second light source 5 form a whole with the housing 3. In this embodiment, the housing 3 is a closed housing, and an inner cavity defined by a left wall, a right wall, a top wall, a bottom wall, a front wall and a rear wall is formed inside. The first light source 1, the light reflection mechanism 2 and the second light source 5 are all accommodated in the inner cavity. The first light source 1 is disposed below the front of the light reflection mechanism 2, and the light emitted by the first light source 1 is exactly irradiated only on the light reflection mechanism 2. The light reflection mechanism 2 comprises a driving mechanism 21 and a reflecting mechanism 22, and the driving mechanism 21 can drive the reflecting mechanism 22 to rotate about an axis. A first front panel is disposed at the front part of the housing 3, and a first flame imaging hole 31 is provided on the first front panel. The shape of the first flame imaging hole 31 is a flame shape. The first flame imaging hole 31 may be an empty hole, or may be made of a transparent material, wherein the flame shape is formed by printing or painting on some positions of the transparent material, etc., thereby forming a transparent hole. The first flame imaging hole 31 in this embodiment is an empty hole. A light blocking plate 4 is further provided above the side of the first light source 1, and the light blocking plate 4 can prevent the light emitted by the first light source 1 from directly passing through the first flame imaging hole 31 to be emitted outward. The second light source 5 is disposed in the front and lower part of the housing 3. The front part of the housing 3 is provided with a second front panel, and the second front panel is provided with a second flame imaging hole 32. The light emitted by the second light source 5 can pass through the second flame imaging holes 32 to be emitted outward. The first front panel and the second front panel may be the same plane of the same panel, or may be formed by partitions of a separate panel, or may be two separate panels. In this embodiment, the first front panel and the second front panel are formed by bending a separate panel into partitions.

The flame simulation projection device of this embodiment further comprises a control unit 6. The housing 3 is provided with a power supply interface 35, and the power supply interface 35 is used to supply power to the control unit 6. The control unit 6 can control the first light source 1, the second light source 5 and the driving mechanism 21 to work. In addition, the housing 3 is further provided with a peripheral drive interface 36, and the peripheral drive interface 36 is matched and connected to the control unit 6. The device in this embodiment can output control signals to the outside through the peripheral drive interface 36. Users can add ambient lights, heating elements and other external equipment as needed.

When this embodiment is used for DIY design, a flame imaging screen 7 and a simulated fuel bed 8 are further provided. The flame imaging screen 7 is provided in front of the first flame imaging hole 31, and the simulated fuel bed 8 is provided above the front part of the second flame imaging hole 32.

The working process of this embodiment is as follows:

When working, the reflecting mechanism 22 rotates according to a certain rule under the driving of the driving mechanism 21, and the light emitted by the first light source 1 is irradiated on the reflecting mechanism 22. The light is reflected by the reflecting mechanism 22 and irradiated on the flame imaging screen 7 after passing through the first flame imaging hole 31, thereby simulating the dynamic effect of real flame burning. The light blocking plate 4 can prevent the light emitted by the first light source 1 from directly passing through the first flame imaging hole 31, so as to avoid forming "dead light" regions on the flame imaging screen 7 that do not change. In addition, the light emitted by the second light source 5 is irradiated on the simulated fuel bed 8 through the second flame imaging hole 32. Since the simulated fuel bed 8 is a structure made of a translucent material for simulating the ash, residual material and residual fire produced by the combustion of real solid fuel, the effect of a fuel bed of flame ash flickering light and dark can be formed. The simulated effect of the simulated fuel bed 8 and the flame effect on the flame imaging screen 7 correspond to each other to together form a viewing picture of flames burning slowly.

Since the flame simulation projection device in this embodiment is a whole, and has its own control unit 6 and power supply interface 35, it can be sold as an independent product. Users can freely match various flame imaging screens 7 and/or simulated fuel beds 8 on the basis of this device. Moreover, due to the existence of the peripheral drive interface 36, it can be easier to carry out various DIY designs and secondary development.

The above description does not limit the present invention, and the present invention is not limited to the above examples. Changes, modifications, additions or substitutions made by a person skilled in the art within the essential scope of the present invention should also belong to the scope of protection of the present invention.

What is claimed:

1. A flame simulation projection device, comprising a first light source (1), a light reflection mechanism (2), a second light source (5) and a housing (3); the first light source (1), the light reflection mechanism (2) and the second light source (5) are separately matched and connected to the housing (3) to form a modularized multi-light source integrated projection device; the first light source (1) is disposed facing the light reflection mechanism (2) and a light emitted by the first light source (1) is irradiated on the light reflection mechanism (2); the housing (3) forms an inner cavity; and the second light source (5) is disposed facing the outside of the inner cavity, the second light source (5) has a first side connecting to the housing (3) and a second side opposite to the first side, and the second side of the second light source (5) is positioned to allow a light emitted from the second side of the second light source (5) to be directly irradiated to the outside; the first light source (1) and the light reflection mechanism (2) are disposed in the inner cavity; wherein a first front panel is disposed at a front part of the housing (3); and the first front panel is provided with a first flame imaging hole (31); and the light emitted by the first light source (1) passes through the first flame imaging hole (31); a second front panel is disposed at a front part of the housing (3), and the second front panel is provided with a second flame imaging hole (32); and the second light source (5) is disposed facing the second flame imaging hole (32), and the light emitted by the second light source (5) passes through the second flame imaging holes (32) to be irradiated to the outside.

2. The flame simulation projection device as claimed in claim 1, wherein a light blocking plate (4) is disposed between the first light source (1) and the first flame imaging hole (31).

3. The flame simulation projection device as claimed in claim 1, wherein the second light source (5) is disposed in the inner cavity or outside the inner cavity.

4. The flame simulation projection device as claimed in claim 1, wherein the first light source (1) is disposed below the light reflection mechanism (2).

5. The flame simulation projection device as claimed in claim 1, wherein the second light source (5) is disposed below a front part of the housing (3).

6. The flame simulation projection device as claimed in claim 1, wherein the flame simulation projection device comprises a control unit (6); and the control unit (6) is separately matched and connected to the first light source (1), the second light source (5) and a driving mechanism (21).

7. The flame simulation projection device as claimed in claim 6, wherein the housing is provided with a peripheral drive interface (36); and the peripheral drive interface (36) is matched and connected to the control unit (6).

8. The flame simulation projection device as claimed in claim 1, wherein the housing (3) is provided with a built-in drive interface (34).

9. The flame simulation projection device as claimed in claim 1, wherein the housing (3) is provided with an installation bracket (33).

10. The flame simulation projection device as claimed in claim 9, wherein the inner cavity is defined by a left wall, a right wall and a bottom wall in an outer shell of the housing.

* * * * *